July 9, 1968

M. SAPOFF ET AL 3,392,054

METHOD OF MANUFACTURING THIN FILM THERMISTORS

Filed Feb. 3, 1965

INVENTORS
JOHN G. FROEMEL
MEYER SAPOFF
BY Albert Konman
ATTORNEY 3,392,054
METHOD OF MANUFACTURING THIN
FILM THERMISTORS
Meyer Sapoff, West Orange, and John G. Froemel,
Verona, N.J., assignors to Victory Engineering Corporation, Springfield, N.J., a corporation of Delaware
Filed Feb. 3, 1965, Ser. No. 429,997
9 Claims. (Cl. 117—217)

This invention relates to a method for making electrical resistance elements. In particular, this invention relates to a method for making thin film resistance elements especially those having a high temperature coefficient of resistance known in the art as "thermistors."

In the manufacture of thermistors it is desirable to provide a structure with a short time response—that is, to design them in such a way that they are capable of being rapidly heated or cooled and thus are quick to respond to temperature changes by exhibiting their characteristic changes in electrical resistance. One way of doing this is to make them in the form of thin flakes.

Previous methods of making flake thermistors have in general proceeded along the lines of making a paste of the appropriate metal oxides in a suitable vehicle, spreading the paste on a flat surface such as an optical flat, drying the paste, removing it from the flat, and firing it at an elevated temperature.

This method was subject to a number of disadvantages, including the necessity of handling thin, fragile flakes of material, and a tendency for the flakes to curl on firing. The tendency to curl is attributed to a gradient in the composition of the film of paste, through the thickness thereof, caused by the tendency of the heavier particles to concentrate near the bottom.

In the attempt to overcome these difficulties, various other methods have been proposed. It has been proposed, for example, to minimize the above mentioned gradient by using a mixture of oxides ground to two different particle sizes, so as to increase the packing fraction.

Another method was to spread the paste directly into a cavity in the block to which it was to be applied and firing it therewith instead of first forming and firing the flake and then cementing it to the block. This method is successful in overcoming some of the above disadvantages, but involves difficulties in control of the thickness and uniformity of the flake.

Still another method involves forming a more or less fluid paste of the metallic oxides in a thermoplastic binder dropping it on the surface of a body of water inside a dam to limit the spread of the floating film, picking up the floating paste on a perforated ceramic wafer and firing the paste on the wafer.

This method also possesses some advantages over the older methods, but is difficult to control because the thickness of the eventual flake depends on many factors including the concentration of oxides in the paste, the viscosity of the vehicle, the size of the drop of paste placed on the water surface, and the area confined within the dam.

An object of this invention, therefore, is to provide improved methods for the manufacture of flake thermistors.

Another object is to provide a reliable method for making thermistors characterized by extreme thinness and extremely rapid time response.

A further object is to provide a method as aforesaid, which eliminates the necessity of handling fragile flakes.

Still another object is to provide a method which positively eliminates the tendency for the flake to curl in firing or to spall away from the substrate by reason of composition or density gradients through the thickness of the flake.

Yet another object is to provide a method in which the thickness of the flake is easily controlled, uniform, and dependent on a minimum number of variables.

A feature of this invention is the use of a dispersion of oxide particles in a vehicle of low surface tension and low viscosity.

Another feature is the formation of a floating dispersion of oxidic particles.

Still another feature resides in the step of allowing the floating particles to disperse freely over the surface of the liquid floating medium and then horizontally compressing the floating particles to a substantially continuous film one particle thick.

Yet another feature resides in the withdrawal of said film from the liquid medium by introducing a ceramic wafer under the surface of the liquid and withdrawing it at an angle through the film.

Other objects, features and advantages will become apparent from the following more complete description and claims and with reference to the accompanying drawings in which elements appearing in more than one view have been given the same reference numerals throughout.

The invention consists of the selection and arrangement of operating steps as more fully described hereinafter.

In one particularly desirable embodiment, this invention contemplates a method of making a temperature sensitive resistance element, which comprises in combination the steps of combining a mixture of metallic oxides with a dispersing vehicle, floating said mixture on a liquid surface to form a dispersion of said oxides on said surface, compressing said dispersion horizontally to form a substantially continuous film one particle thick, picking up said film on a substrate, and firing said film and said substrate at a temperature at least equal to the sintering temperature of said metallic oxides.

Referring now to the figures.

Figure 1:
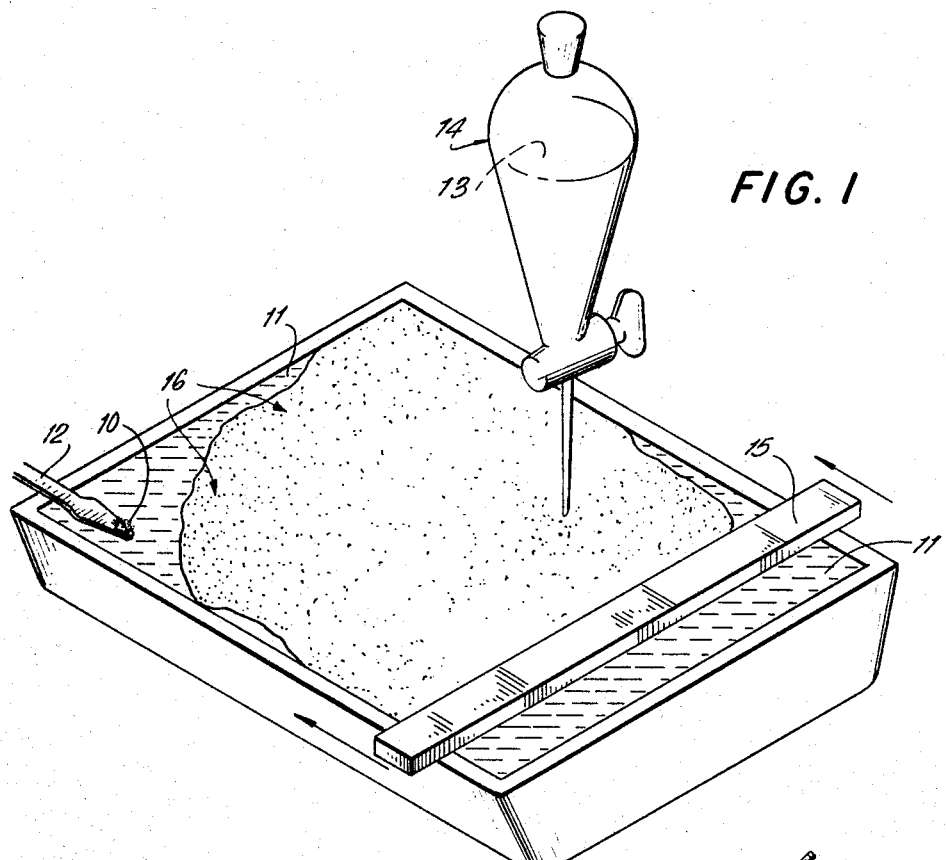
FIGURE 1 is a perspective view of the apparatus used for forming a film of oxide material according to the process of the invention.
Figure 2:
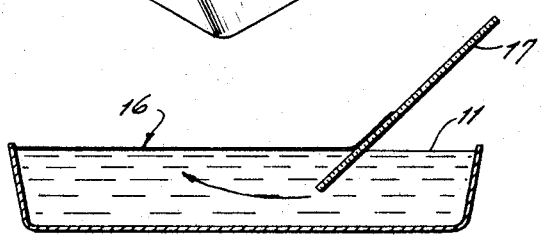
FIGURE 2 is a diagrammatic cross-sectional view of the apparatus of FIGURE 1, showing the manner in which the film is removed from the surface of the liquid.

In carrying out the method of this invention the starting material is a material which, after firing or curing has a high temperature coefficient of resistance. Conventional materials for making thermistors are well known to the art and need not be described in detail. Among such conventional materials are the "triple oxide" compositions. An example of such a composition is the following:

| | Percent (by weight of metals and oxide) |
|---|---|
| Manganese oxide, $Mn_3O_4$ | 56.0 |
| Nickel oxide, NiO | 14.0 |
| Cobalt oxide, $Co_2O_3$ | 30.0 |
| | 100.0 |

Other proportions and other metal oxides may be used as will be obvious to those skilled in the art. Also compounds which yield the oxides on firing may be used in place of the oxides themselves, if desired. Such compounds are intended to be included where reference is had herein to "metal oxides."

The metal oxide composition is ground to a degree of fineness such that the particles have cross-sectional dimensions below one micron. Preferably, the starting material is finely divided having for example, a cross-sectional dimension of 1.1 to 1.4 micron. Starting materials which are already rather finely divided reduce the amount of milling that must be done. The milling may conveniently be done in a wear-resistant ball mill using balls of alumina.

After the thermistor material has been ground to the required fineness it is preferably combined with a dispersing vehicle to assist in floating it on the liquid medium. It is possible to omit the dispersing medium and simply float the dry oxides on the liquid medium, but it is difficult to obtain a good dispersion on the surface of the liquid, and also difficult to prevent the oxides from wetting and sinking unless a dispersing vehicle is used.

The dispersing vehicle should be a material of low viscosity and low surface tension and should be insoluble in the liquid medium used for flotation (which is normally water). The function of the dispersing vehicle is to assist the particles to spread out over the surface of the flotation liquid. A plastic binder or the like should therefore be avoided. Many dispersing vehicles may be used as will be evident to those skilled in the art. A particularly effective one, however, is a solution of 5% amyl acetate in toluene of the grade designated as suitable for nitrating.

The amount of dispersing vehicle used is not critical beyond the point where there is enough to coat the particles and prevent them from being readily wetted by water. For convenience, however, it is perferable to use enough of the dispersing vehicle to form a fluid suspension or light paste of the metal oxides.

The metal oxides 10 are then floated on the surface of a body of water 11 by picking them up on a spatula 12 and depositing them on the surface. Alternatively, a fluid suspension 13 of the metal oxides may be dropped on the surface of the water from a separatory funnel 14. In either case, the oxides are allowed to spread freely over the surface of the water to form a film 16. The amount added should be small enough so that the oxide particles have room to be completely dispersely—i.e. they should not be forced to "pile up" to a layer more than one particle thick at any point.

At this stage, the film is of the required thickness being one particle deep, but is discontinuous in that the particles are separated from one another in the horizontal plane. To render the film continuous a dam 15 is moved toward the floating film as indicated by the arrows in FIGURE 1. The dam pushes the film ahead of it compressing it until the film is substantially continuous and there remain no open spaces between particles. This point is easily recognized by the incipient formation of wrinkles or overlapped portions in the film. The dam is stopped at this point and the volatile materials (toluence and amyl acetate) are allowed to evaporate.

If a slightly thicker film is desired, it can easily be made, in a controlled manner by moving the dam further inward to further compress the film on the surface of the liquid. The compressed film thereby becomes a multiple layered film. Its thickness growth is controlled and uniform as compared with the uneven film produced when the particles are initially confined to a limited portion of the liquid surface.

The next step is to lift the film from the surface of the water and onto a substrate 17. The nature of the substrate depends on the intended use of the thermistor and may be of a ceramic or a metallic nature. Typical ceramic substrates are BeO, MgO, $Al_2O_3$, boron nitride, and quartz. Ceramic or metals capable of withstanding the firing temperature used to cure the thermistor oxides may be used. In the case of the oxide composition specified above, the temperature used is about 1300° C., which is typical.

A typical metallic substrate is nickel.

The substrate is first cleaned of organic matter by heating it to 200° C., and is then kept wet in distilled water until ready for use.

To pick up the oxide film the substrate is held with tweezers at an angle of 90° to the film surface and pushed down through the film. The substrate, while still immersed, is turned to an angle of about 45° with the film and brought up and forward through the film so as to float the film on the substrate. Excess water may be drawn off by touching a filter paper to the bottom edge of the coated substrate.

The coated substrate is then further dried, for example by subjecting it to infra-red heat or to heat lamps for a period of two hours.

The coated substrate is then ready for sintering, or curing, which is accomplished by firing it at elevated temperature. The firing may be done at temperatures up to 1300° C. for periods as long as 16 hours. During the firing operation the film bonds to the substrate and the individual particles in the film sinter to one another.

To incorporate the thermistor into an electrical circuit it is necessary to provide it with electrode contacts. The contacts may be of any conducting material which can be applied as a thin, even coating and which is chemically inert to the substrate or the thermistor coating. Silver, gold, platinum and alloys of these and other metals are commonly used. In connection with the thermistors of this invention, platinum bright contacts fired at temperatures between 400 and 800° C. have been very successful.

Figure 3:
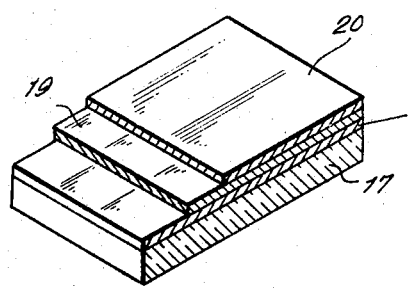
FIGURE 3 is a fragmentary perspective view of a portion of a resistance element prepared according to one embodiment of the invention.

The contacts may be placed at spaced points on the upper surface of the thermistor material. In the case where the substrate is a conductor, such as nickel, the substrate may serve as one contact. According to another embodiment of the invention, a layer of conductive material such as platinum may be deposited on a ceramic or metal substrate before laying down the film of thermistor material. The thermistor film is then applied, dried and fired as described above, and finally a second layer of conductive material is applied and fired on over the thermistor material. This procedure results in a structure such as that illustrated in FIGURE 3, having a substrate 17, a layer of conductive material 18, a sintered thermistor oxide layer 19, and a second conductive layer 20 on top of oxide layer 19.

The deposited films of conductive metal may be applied in a variety of ways, as will be apparent to those skilled in the art. For example, they may be applied by cathode sputtering after shielding any portions on which a deposit of conductive metal is not desired or by applying a dry coating of the metal, or a dispersion thereof in a volatile or thermally decomposable vehicle and firing to the sintering temperature. Instead of a dry coating or dispersion of the metal itself one may apply a coating or dispersion of a compound which decomposes during firing to leave a deposit of the metal.

The resistance elements made according to this invention are useful in substantially all of the known applications for temperature-sensitive resistances, including, for example in alarm systems, temperature-control circuits, infra-red detectors, etc. When used in such applications they exhibit greatly improved sensitivity and uniformity of response because of the exceptionally thin and uniform characteristics of the thermistor oxide layer. They also exhibit an extremely rapid time-response because of the small mass of the thin thermistor film, which allows it to be very rapidly heated or cooled.

In addition to producing thermistors of improved operating characteristics, the method of this invention is easily and cheaply carried out as compared with methods heretofore proposed. It eliminates any necessity for handling thin, fragile flakes of thermistor oxide material consequently reducing losses due to breakage. It also eliminates any tendency for the oxide material to fracture, curl, or spall away from the substrate during firing due to particle-size gradients through the thickness of the film. Being only one particle thick to begin with the oxide film is incapable of exhibiting such gradients.

While this invention has been described in terms of certain preferred embodiments and illustrated by way of certain drawings, these are illustrative only as many alternatives and equivalents will readily occur to those skilled in the art without departing from the spirit and scope of the invention. The invention is therefore not to be construed as limited except as set forth in the appended claims.

Having thus fully described the invention, what is claimed as new and desired to be secured by Letters Patent of the United States is:

1. A method of making an electrical resistance element, which comprises in combination the steps of providing a finely-divided metal oxide material, floating said metal oxide material on a liquid surface to form a dispersion of said metal oxide material on said surface, compressing said dispersion horizontally to form a substantially continuous film one particle thick, picking up said film on a substrate, and firing said substrate and said film at a temperature at least equal to the sintering temperature of said metal oxide material.

2. A method of making an electrical resistance element, which comprises in combination the steps of providing a finely-divided metal oxide material, combining said metal oxide with a dispersing vehicle in amount at least sufficient to coat the particles of said metal oxide material, floating said metal oxide material on a liquid surface to form a dispersion of said metal oxide material on said surface, compressing said dispersion horizontally to form a substantially continuous film one particle thick, picking up said film on a substrate, and firing said substrate and said film at a temperature at least equal to the sintering temperature of said metal oxide material.

3. A method of making an electrical resistance element, which comprises in combination the steps of providing a finely-divided metal oxide material, suspending said metal oxide in a dispersing vehicle to form a suspension thereof, floating said suspension on a liquid surface to form a dispersion of said metal oxide material on said surface, compressing said dispersion horizontally to form a substantially continuous film one particle thick, picking up said film on a substrate and firing said film and said substrate at a temperature at least equal to the sintering temperature of said metal oxide material.

4. A method according to claim 3, in which said dispersing vehicle is a mixture of toluene and amyl acetate.

5. A method of making an electrical resistance element, which comprises in combination the steps of providing a finely-divided metal oxide material, floating said metal oxide material on a liquid surface to form a dispersion of said metal oxide material on said surface, compressing said dispersion horizontally to form a substantially continuous film one particle thick, depositing said film on a substrate, firing said substrate and said film at a temperature at least equal to the sintering temperature of said metal oxide material, and coating at least a portion of said film with a conductive metal.

6. A method according to claim 5, in which said fired film is coated with said conductive metal over at least two discrete, spaced areas on the surface of said film.

7. A method according to claim 5, in which said substrate is a conductive metal.

8. A method according to claim 5, in which said substrate is a non-conductive material, said method comprising the additional step of coating said substrate with a conductive metal prior to depositing said film of metal oxide material on said substrate.

9. A method of making an electrical resistance element, which comprises in combination the steps of providing a finely-divided metal oxide material, floating said metal oxide material on a liquid surface to form a dispersion of said metal oxide material on said surface, compressing said dispersion horizontally to form a substantially continuous multiple layered film, picking up said film on a substrate, and firing said substrate and said film at a temperature at least equal to the sintering temperature of said metal oxide material.

References Cited

UNITED STATES PATENTS

| | | |
|---|---|---|
| 982,370 | 1/1911 | Kurz. |
| 2,720,573 | 10/1955 | Lundqvist. |

FOREIGN PATENTS

| | | |
|---|---|---|
| 776,970 | 6/1957 | Great Britain. |

EARL M. BERGERT, *Primary Examiner.*

H. F. EPSTEIN, *Assistant Examiner.*